United States Patent
Kanzaki et al.

(10) Patent No.: US 12,526,124 B2
(45) Date of Patent: Jan. 13, 2026

(54) TIMING DETERMINATION APPARATUS

(71) Applicant: DENSO CORPORATION, Kariya (JP)

(72) Inventors: Takemasa Kanzaki, Kariya (JP); Yusuke Matsushita, Kariya (JP); Nobuyuki Kondoh, Kariya (JP); Takeshi Sugashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/659,380

(22) Filed: May 9, 2024

(65) Prior Publication Data

US 2024/0405964 A1 Dec. 5, 2024

(30) Foreign Application Priority Data

May 29, 2023 (JP) .................... 2023-087805

(51) Int. Cl.
*H04L 7/02* (2006.01)
(52) U.S. Cl.
CPC ..................... *H04L 7/02* (2013.01)
(58) Field of Classification Search
CPC ........ H04L 63/08; H04L 9/12; H04L 63/123; H04L 9/324; H04L 2209/84; B60R 16/023
See application file for complete search history.

(56) References Cited

U.S. PATENT DOCUMENTS

2018/0219872 A1* 8/2018 Sugashima ............ H04L 63/08

FOREIGN PATENT DOCUMENTS

JP 2023-19384 A 2/2023

* cited by examiner

*Primary Examiner* — Mahran Y Abu Roumi
(74) *Attorney, Agent, or Firm* — Posz Law Group, PLC

(57) ABSTRACT

A timing determination apparatus includes a data acquisition unit, a master counter, a subtractor, a reference setting unit, and a comparing determination unit. The data acquisition unit acquires data sets from hardware devices. An output cycle counter value is included in each of the data sets. The master counter is incremented each time the predetermined period has elapsed. The subtractor calculates difference value of each of the data sets in a case where the data acquisition unit acquires the data sets at same timing. The reference setting unit sets the difference value as a reference difference value for each hardware device. The comparing determination unit determines whether the hardware devices transmit the data sets at same time point after the reference setting units sets the reference difference value for each hardware device.

11 Claims, 5 Drawing Sheets

TIMING DETERMINATION APPARATUS

CROSS REFERENCE TO RELATED APPLICATION

This application is based on Japanese Patent Application No. 2023-087805 filed on May 29, 2023, the disclosure of which is incorporated herein by reference.

TECHNICAL FIELD

The present disclosure relates to a timing determination apparatus.

BACKGROUND

A timing determination apparatus may determine a timing at which hardware devices transmit data sets, respectively.

SUMMARY

The present disclosure describes a timing determination apparatus including a data acquisition unit, a master counter, a subtractor, a reference setting unit and a comparing determination unit.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
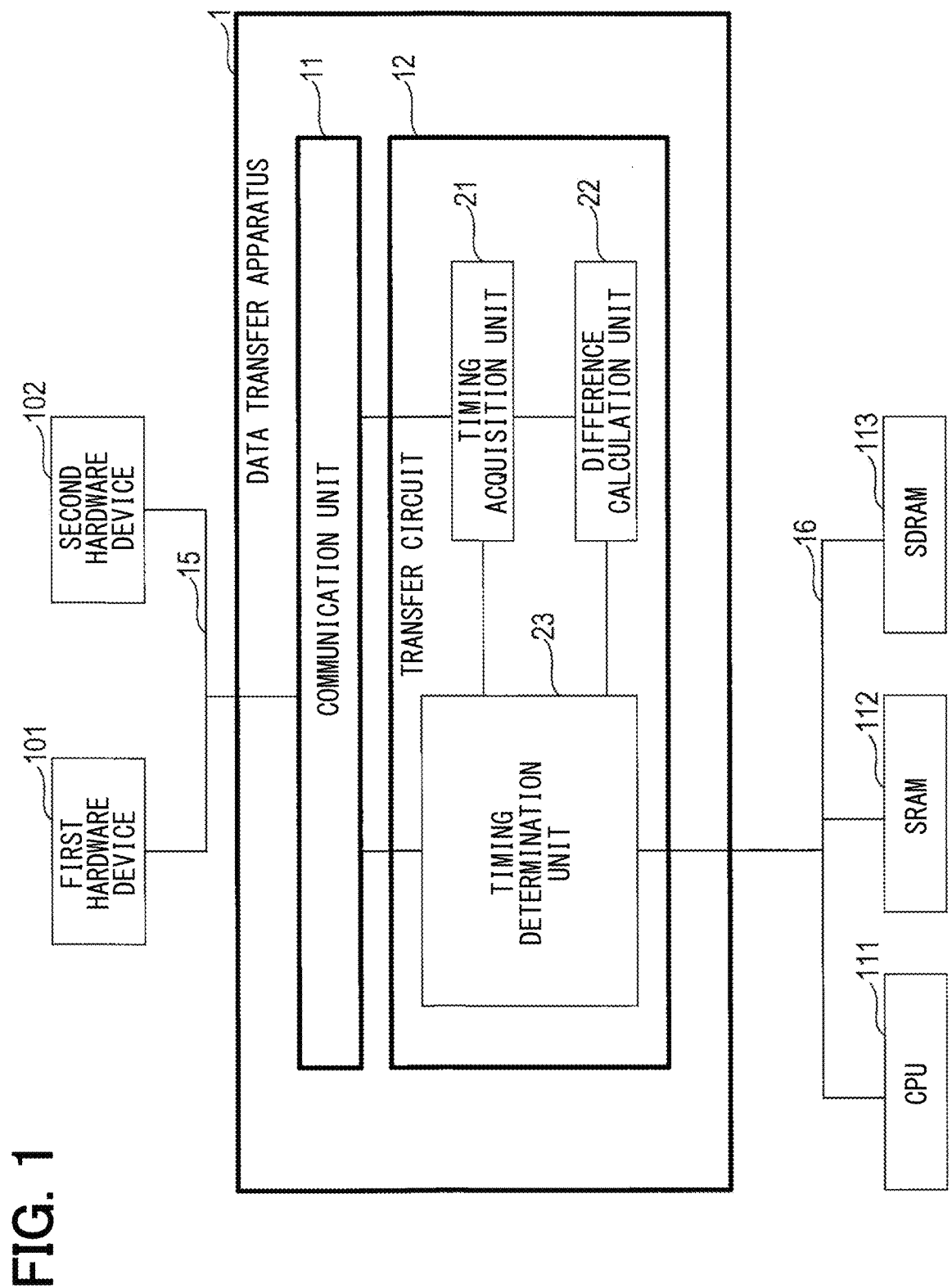
FIG. 1 is a block diagram that illustrates a configuration of a data transfer apparatus.

In a related example, when a subject in-vehicle device transmits delay time information indicative of data transmitting propagation delay time to another in-vehicle device, it is possible to correct the propagation delay time based on the delay time information in the other in-vehicle device. As a result, even though the data propagation delay time in a direction and the data propagation delay time in another direction between in-vehicle devices are different, the other in-vehicle device may adopt the corrected propagation delay time to perform accurate time correction.

However, as the inventors of the present application had been studied the above related example, the inventors found out that it may required to enhance the precision of the timing of handling data sets because of autonomous driving vehicles, widespread of services for autonomous driving vehicles, and precision enhancement. Thus, the inventors considered that there will be a demand for acquiring data sets at same time point in future.

According to an aspect of the present disclosure, a timing determination apparatus includes a data acquisition unit, a master counter, a subtractor, a reference setting unit, and a comparing determination unit.

Each of hardware devices includes a cycle counter incremented each time a certain period has elapsed, and transmits a data set including an output cycle counter value being a value of the cycle counter at the time of transmitting the data set. The data acquisition unit acquires output data sets being data sets transmitted from the respective hardware devices.

The master counter is incremented each time a predetermined period has elapsed. The subtractor calculates a difference value in a case where the data acquisition unit acquires the data sets from the respective hardware devices at same timing. The difference value is a difference between the output cycle counter value added to the output data set and the identical master counter value being a value of the master counter at the same timing.

The reference setting unit sets the difference value calculated by the subtractor as a reference difference value for each of the hardware devices. After the reference setting unit sets the reference difference values for each of the hardware devices, the comparing determination unit determines whether the hardware devices satisfy a matching determination condition. The matching determination condition indicates whether a difference value calculated by the subtractor matches the reference difference value. In a case where at least one of the hardware devices does not satisfy the matching determination condition, the comparing determination unit determines that the output data sets are not transmitted from the respective hardware devices at the same time point.

The timing determination apparatus can determine that the output data sets are transmitted at the identical time. For this reason, the timing determination apparatus according to the present disclosure prevents the occurrence of a situation in which the output data sets are determined to have been transmitted at the same time point even though they are not transmitted at the same time point. Thus, it is possible to improve the reliability of data acquisition.

The following describes one or more embodiments of the present disclosure with reference to the drawings. As shown in FIG. 1, a data transfer apparatus 1 according to the present embodiment includes a communication unit 11 and a transfer circuit 12.

The communication unit 11 transmits data or receive data from devices connected to the bus 15 according to a preset communication protocol such as CAN communication protocol. CAN is an abbreviation for Controller Area Network. CAN is a registered trademark.

For example, a first hardware device 101 and a second hardware device 102 are connected to the bus 15. The transfer circuit 12 is a digital circuit including a large number of logic circuits, and includes a timing acquisition unit 21, a difference calculation unit 22, and a timing determination unit 23.

For example, a CPU 111, an SRAM 112, and an SDRAM 113 are connected to the timing determination unit 23 via a bus 16. CPU is an abbreviation for Central Processing Unit. SRAM is abbreviation for Static Random Access Memory. SDRAM is abbreviation for Synchronous Dynamic Random Access Memory.

Figure 2:
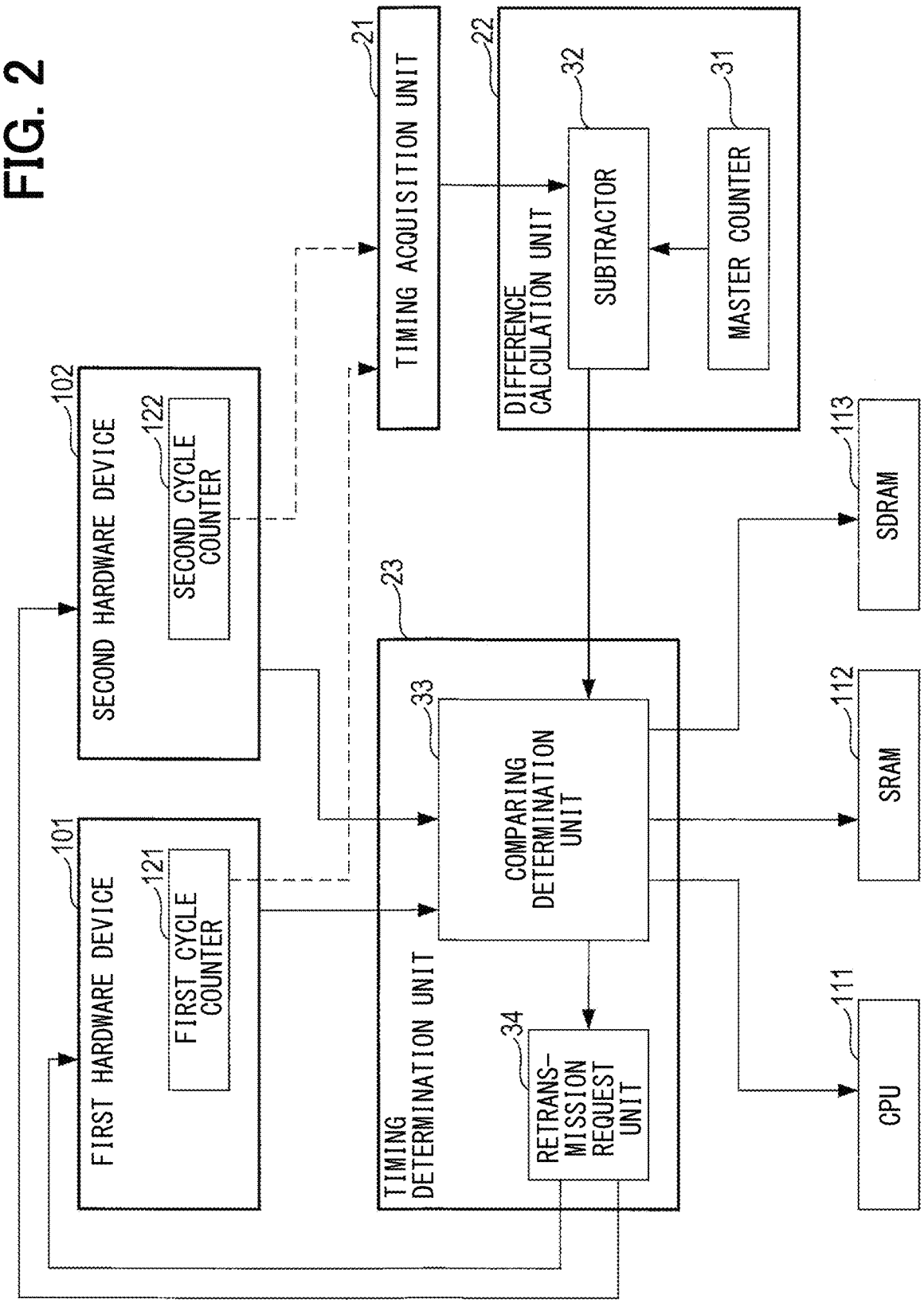
FIG. 2 is a functional block diagram showing a functional configuration of a data transfer apparatus.

As illustrated in FIG. 2, the first hardware device 101 and the second hardware device 102 execute different predetermined processes and output a first data frame and a second data frame, respectively. The first hardware device 101 is, for example, a capturing device that captures the front view of a vehicle. The capturing device may also be referred to as a photographing device. The second hardware device 102 is, for example, a positioning device that detects the position of the vehicle based on a GPS signal received via a GPS antenna mounted on the vehicle.

The first and second data frames are formed by adding output source hardware identification information (hereinafter referred to as output source hardware ID) and the data identification information (hereinafter referred to as data ID) to the respective data generated by the first hardware device 101 and the second hardware device 102. The output source hardware ID is identification information indicating the hardware device being the output source of the data frame. The data ID is identification information indicating the data type of the generated data. In the present disclosure, the data generated by the first hardware device 101 may also be referred to as a first data set, and the data generated by the second hardware device 102 may also be referred to as a second data set.

The first and second data frames include a hardware ID field, a data ID field, and a data field. The hardware ID field stores the output source hardware ID. The data ID field stores the data ID.

The data fields of the first and second data frames store data generated by the first and second hardware devices 101, 102, respectively. The first and second hardware devices 101, 102 include a first cycle counter 121 and a second cycle counter 122, respectively.

The first and second cycle counters 121, 122 are counters that are incremented (in other words, added by 1) every time a certain predetermined period has elapsed. The value of the first cycle counter 121 (hereinafter referred to as first cycle counter value) at the time of the first hardware device 101 transmitting the first data frame is added to the first data frame. Similarly, the value of the second cycle counter 122 (hereinafter referred to as second cycle counter value) at the time of the second hardware 102 transmitting the second data frame is added to the second data frame.

The timing acquisition unit 21 of the transfer circuit 12 acquires the first cycle counter value and the second cycle counter value by extracting the first cycle counter value and the second cycle counter value from the first data frame and the second data frame, respectively. The first data frame and the second data frame are received from the first and second hardware devices 101, 102 via the communication unit 11, respectively.

The difference calculation unit 22 of the transfer circuit 12 includes a master counter 31 and a subtractor 32. The master counter 31 is a counter that is incremented every time a certain predetermined period has elapsed. In the master counter 31 and the first and second cycle counters 121 and 122, the time intervals for incrementation (in other words, the above-mentioned predetermined period) coincide with each other. Hereinafter, the value of the master counter 31 will be referred to as a master counter value.

The subtractor 32 calculates the difference (hereinafter referred to as a first difference value) between the first cycle counter value and the master counter value acquired by the timing acquisition unit 21, and calculates the difference (hereinafter referred to as a second difference value) between the second cycle counter value and the master counter value acquired by the timing acquisition unit 21.

The timing determination unit 23 of the transfer circuit 12 outputs the first and second data frames received from the first and second hardware 101, 102 via the communication unit 11 to the CPU 111, SRAM 112, and SDRAM 113.

The timing determination unit 23 includes a comparing determination unit 33 and a retransmission request unit 34. When the first and second data frames are acquired from the first and second hardware devices 101, 102 at an identical time, the comparing determination unit 33 determines whether the first and second data frames are output at the identical time. If the first and second data frames are output at the identical time, the comparing determination unit 33 outputs the first and second data frames to the CPU 111, SRAM 112, and SDRAM 113.

If the first and second data frames are not output at the same time point, the retransmission request unit 34 outputs a retransmission request, which will be described later, to either the first hardware device 101 or the second hardware device 102. The following describes a process executed by the transfer circuit 12.

After the data transfer apparatus 1 is powered on, the transfer circuit 12 acquires the first and second data frames from the first and second hardware device 101, 102 at an arbitrary timing, and extracts the first and second cycle counter values from the first and second data frames.

The transfer circuit 12 acquires the master counter value from the master counter 31 at the time of acquiring the first data frame or the second data frame. The transfer circuit 12 calculates the first reference difference value by subtracting the master counter value from the first cycle counter value, and calculates the second reference difference value by subtracting the master counter value from the second cycle counter value.

The transfer circuit 12 stores the calculated first and second reference difference values in the transfer circuit 12. For example, as indicated in the frame FL1 of FIG. 3, the first cycle counter value and second cycle counter value are "200" and "300", respectively. The first and second cycle counter values are acquired at arbitrary timing after the transfer circuit 12 is powered on. The master counter value at the timing of acquiring the first data frame or the second data frame is "100".

In this situation, the first reference difference value is "100", and the second reference difference value is "200". Subsequently, when the transfer circuit 12 acquires the first and second data frames from the first and second hardware devices 101, 102 at the identical timing, the transfer circuit 12 extracts the first and second cycle counter values from the first and second data frames, respectively.

The transfer circuit 12 acquires the master counter value from the master counter 31 at the time of acquiring the first data frame or the second data frame. The transfer circuit 12 calculates a first difference value acquired by subtracting the master counter value from the first cycle counter value, and calculates a second difference value acquired by subtracting the master counter value from the second cycle counter value.

The transfer circuit 12 determines that the first data frame and the second data frame are output at the same time point, in a case where the first difference value matches the first reference difference value and the second difference value matches the second reference difference value.

The transfer circuit 12 determines that the first data frame and the second data frame are not output at the same time point, in a case where the first difference value does not match the first reference difference value and the second difference value does not match the second reference difference value.

Figure 3:
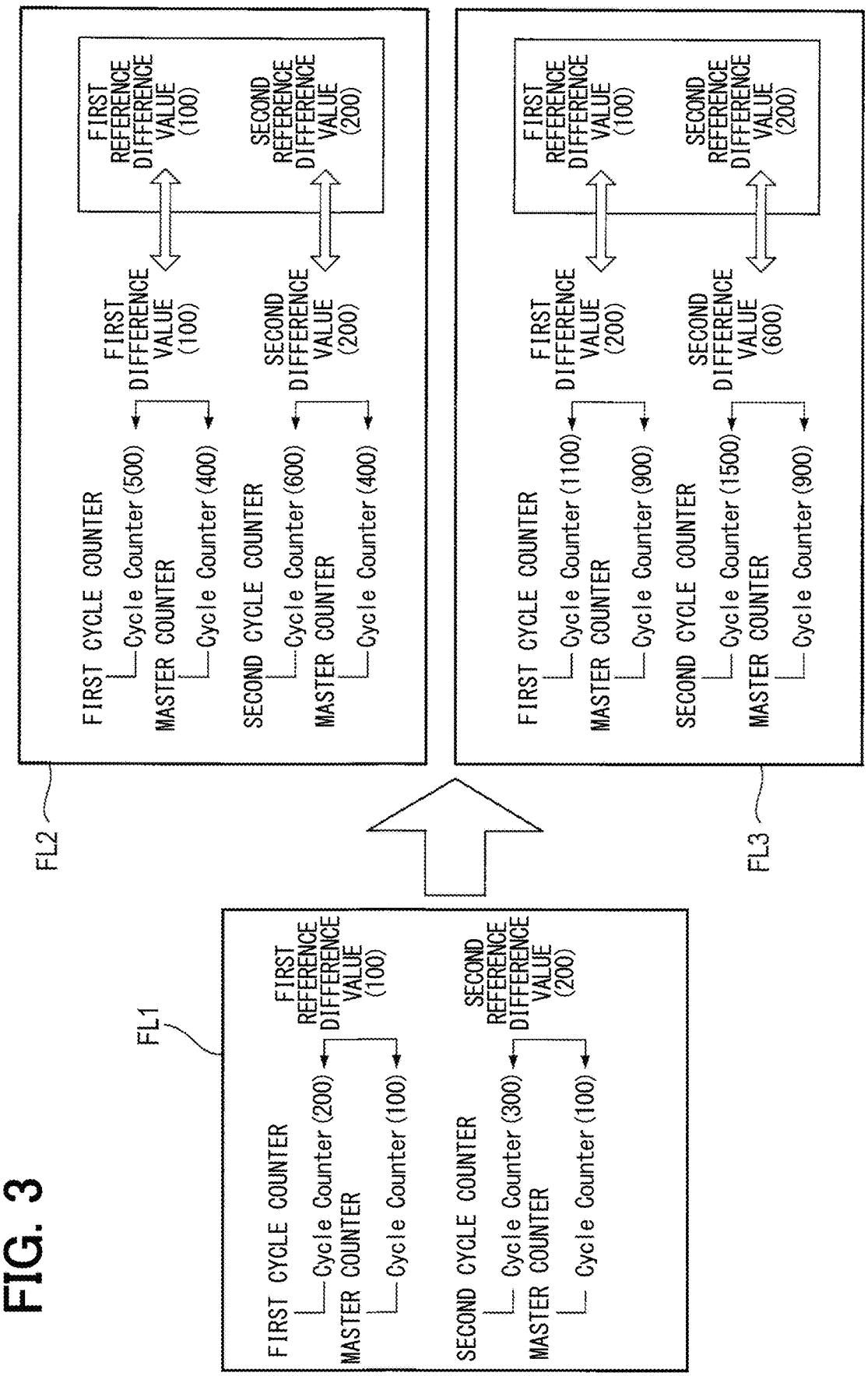
FIG. 3 illustrates a first reference difference value, a second reference difference value, a first difference value and a second difference value.

As indicated in the frame FL2 of FIG. 3, the first cycle counter value and second cycle counter value are "500" and "600", respectively. The first and second cycle counter values are added to the first and second data frames acquired at the same time point, respectively. The master counter value at the timing of acquiring the first data frame or the second data frame is "400".

In this situation, the first difference value is "100" and the second difference value is "200". Therefore, the first difference value matches the first reference difference value, and the second difference value matches the second reference difference value. Therefore, the transfer circuit 12 determines that the first data frame and the second data frame are output at the same time point.

As indicated in the frame FL3 of FIG. 3, the first cycle counter value and second cycle counter value are "1100" and "1500", respectively. The first and second cycle counter values are added to the first and second data frames acquired at the same time point, respectively. The master counter value at the timing of acquiring the first data frame or the second data frame is "900".

In this situation, the first difference value is "200" and the second difference value is "600". Therefore, the first difference value does not match the first reference difference value, and the second difference value does not match the second reference difference value. Therefore, the transfer circuit 12 determines that the first data frame and the second data frame are not output at the same time point.

Figure 4:
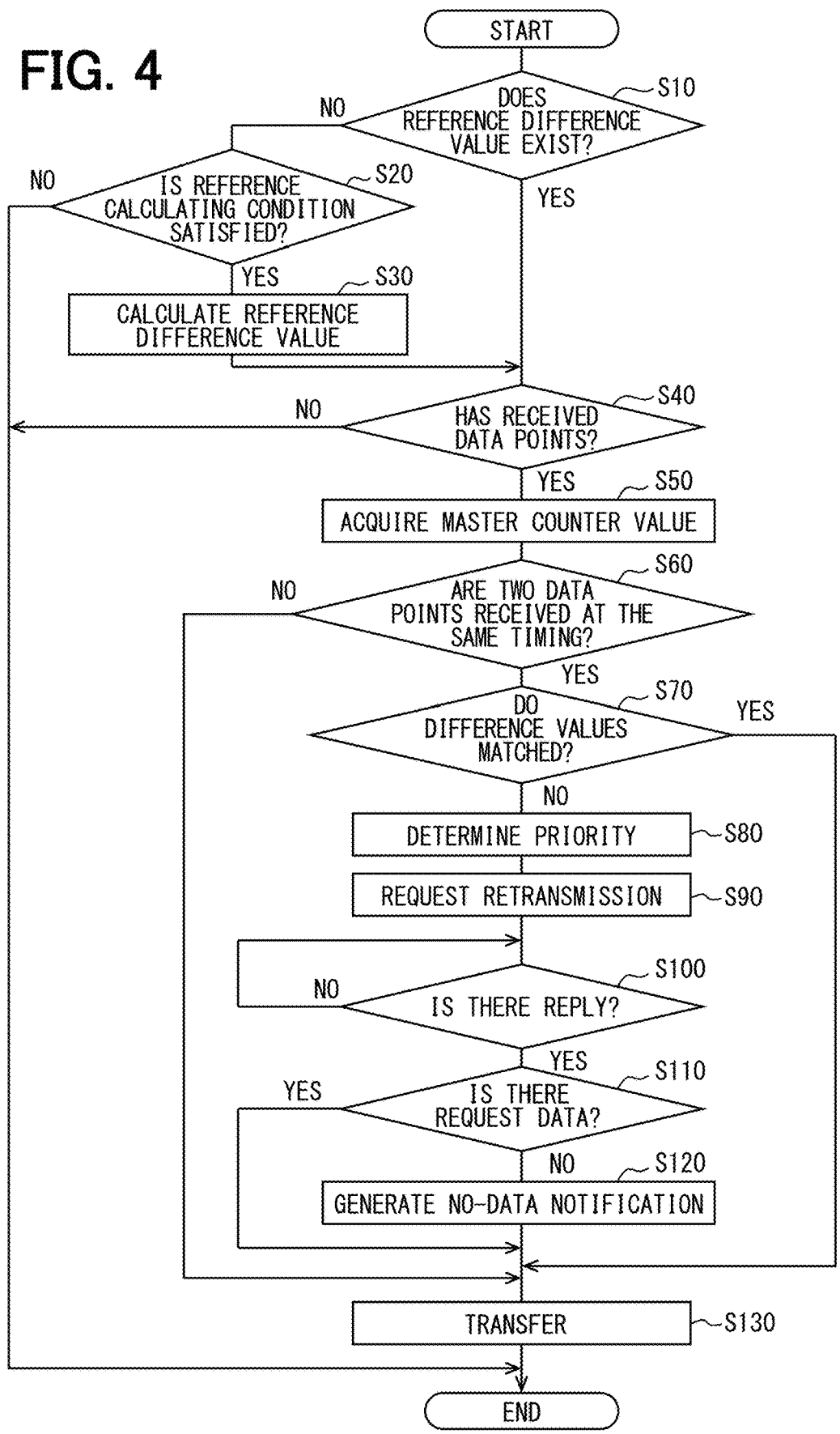
FIG. 4 is a flowchart showing a process executed by a transfer circuit.

The following describes a process executed by the transfer circuit 12. As shown in FIG. 4, the transfer circuit 12 determines whether the first reference difference value and the second reference difference value are stored in S10. In a case where the first reference difference value and the second reference difference value are stored, the transfer circuit 12 shifts the process to S40. On the other hand, in a case where the first reference difference value and the second reference difference value have not been stored, the transfer circuit 12 determines whether a preset reference calculation condition is satisfied in S20. The standard calculation condition according to the present embodiment is to acquire the first and second data frames at the identical timing. The transfer circuit 12 determines that the first and second data frames are acquired at the identical timing, in a case where the second data frame is received by the communication unit 11 in a period from a time point where the first data frame received by the communication unit 11 to a time point where a preset identical timing determination time has elapsed. Similarly, the transfer circuit 12 determines that the first and second data frames are acquired at the identical timing, in a case where the first data frame is received by the communication unit 11 in a period from a time point where the second data frame received by the communication unit 11 to a time point where the identical timing determination time has elapsed.

In a case where the reference calculation condition is not satisfied, the transfer circuit 12 temporarily ends the process. On the other hand, when the reference calculation condition is satisfied, the transfer circuit 12 calculates the first and second reference difference values based on the above procedure in S30, and stores the calculated first and second reference difference values. After storing the first and second reference difference values, the transfer circuit 12 shifts the process to S40.

When proceeding to S40, the transfer circuit 12 determines whether the first data frame or the second data frame has been received by the communication unit 11. In a case where the first and second data frames has not been received by the communication unit 11, the transfer circuit 12 temporarily ends the process.

On the other hand, in a case where the first data frame or the second data frame is received by the communication unit 11, the transfer circuit 12 acquires the master counter value from the master counter 31 in S50.

The transfer circuit 12 determines whether the first and second data frames are received at the identical timing in S60. Whether the first and second data frames are received at the identical timing is determined under the same condition as the reference calculation condition described above.

In a case where the first and second data frames have not been received at the identical timing, the transfer circuit 12 shifts the process to S130. On the other hand, if the first and second data frames are received at the identical timing, the transfer circuit 12 determines whether the first difference value of the received first data frame matches the first reference difference value and whether the second difference value of the received second data frame matches the second reference difference value.

In a case where the first difference value matches the first reference difference value and the second difference value matches the second reference difference value, the transfer circuit 12 shifts the process to S130. On the other hand, in a case where the first difference value does not match the first reference difference value or the second difference value does not match the second reference difference value, the transfer circuit 12 determines the priorities of the first hardware device 101 and the second hardware device 102 in S80. In particular, the priority order is determined based on the priorities preliminarily set for the first hardware device 101 and the second hardware device 102. For example, in a case where the priority of the first hardware device 101 is higher than the priority of the second hardware device 102, the first hardware 101 has the first priority and the second hardware 102 has the second priority.

In S90, the transfer circuit 12 outputs a retransmission request to the hardware device with lower priority. For example, in a case where the first priority corresponds to the first hardware device 101 and the second priority corresponds to the second hardware device 102, the transfer circuit 12 outputs a retransmission request to the second hardware device 102.

Figure 5:
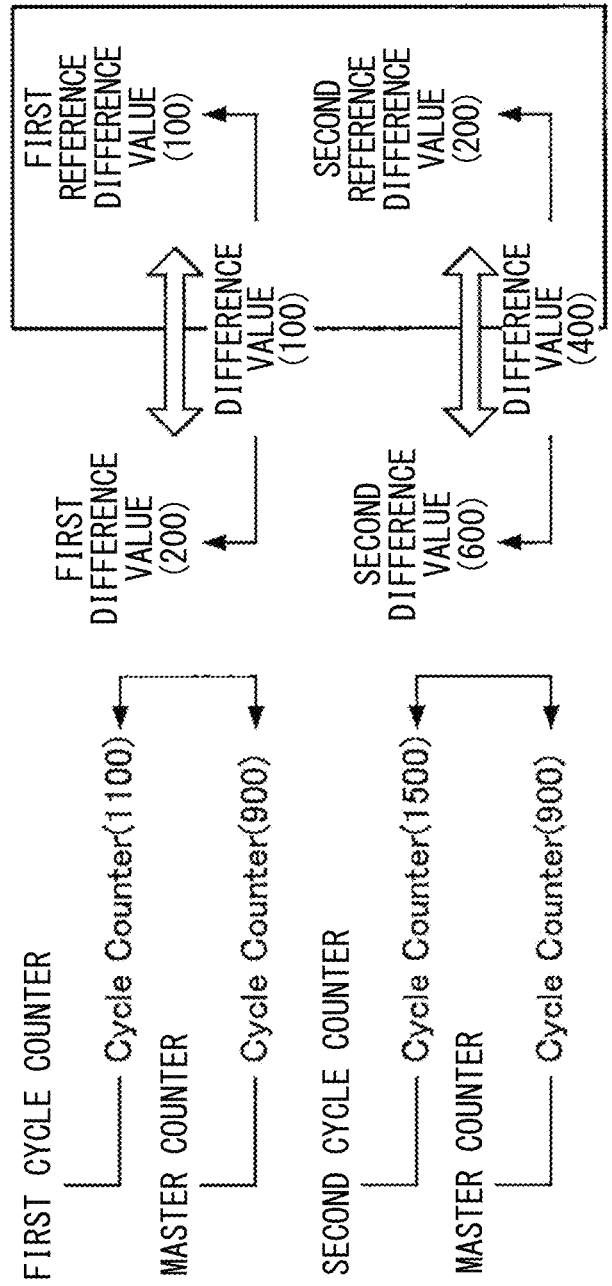
FIG. 5 illustrates a data instruction method using a retransmission request.

For example, as shown in FIG. 5, in a case where the difference value between the first difference value and the first difference reference value is "100" and the difference value between the second difference value and the second reference difference value is "400", the difference value between the "100" and "400" is "300".

Therefore, the transfer circuit 12 outputs a retransmission request to the second hardware device 102. The retransmission request is a request for retransmitting the second data frame that stores data at the second cycle counter value (in other words, "1200") where the difference between the second cycle counter value and the master counter value is "300".

When the process in S90 is completed, as shown in FIG. 4, the transfer circuit 12 determines whether there is a reply from the output destination of the transmission request in S100. In a case where there is no reply from the output destination of the retransmission request, the transfer circuit 12 waits until a reply is received from the output destination of the retransmission request by repeating the process in S100.

Subsequently, when a reply is received from the output destination of the retransmission request, the transfer circuit 12 determines whether the reply is a data frame acquired by the retransmission request or no-data notification in connection to the retransmission request. The no-data notification is indicative of absence of data, and may also be referred to as absence notification in the present disclosure.

In a case where the reply is the data frame acquired by the retransmission request, the transfer circuit 12 shifts the process to S130. On the other hand, in a case of no-data notification, the transfer circuit 12 generates the no-data notification to be output to the CPU 111, SRAM 112, and SDRAM 113 in S120, and shifts the process to S130.

When the process is shifted to S130, the transfer circuit 12 transfers the data received from the first and second hardware devices 101, 102 to the CPU 111, SRAM 112, and SDRAM 113, and temporarily ends the process. Transfer modes of the transfer circuit 12 include the following first transfer mode, second transfer mode, third transfer mode, and fourth transfer mode.

In the first transfer mode, the transfer circuit 12 outputs only data corresponding to the first data frame. In the second transfer mode, the transfer circuit 12 outputs only data corresponding to the second data frame.

In the third transfer mode, the transfer circuit 12 outputs both of data corresponding to the first data frame and data corresponding to the second data frame. In the fourth transfer mode, the transfer circuit 12 outputs data corresponding to the first data frame and the no-data notification.

The transfer circuit 12 repeatedly executes the processes including S10 to S130 during in an operation state of the transfer circuit 12. The method of realizing these elements constituting the data transfer apparatus 1 is not limited to software, and some or all of the elements may be realized by using one or more hardware devices. For example, when the above functions are implemented by an electronic circuit that is hardware, the electronic circuit may be implemented by a digital circuit that includes a large number of logic circuits, an analog circuit, or a combination of the digital circuit and the analog circuit.

The data transfer apparatus 1 described above includes the communication unit 11, the master counter 31, and the transfer circuit 12. The communication unit 11 acquires data (hereinafter referred to as output data) transmitted from the first and second hardware devices 101, 102. The first and second hardware devices 101, 102 have the first and second cycle counters 121, 122, respectively. The first and second cycle counters 121, 122 are incremented each time a certain period has elapsed. The first and second hardware devices 101, 102 output data to which the respective values (hereinafter referred to as output cycle counter values) of the first and second cycle counters 121, 122 are added at the time point of outputting the data.

The master counter 31 is incremented each time a certain period has elapsed. In a case where multiple pieces of output data are acquired at the identical timing from the first and second hardware devices 101, 102, the transfer circuit 12 calculates the first and second difference values indicating the difference between the output cycle counter value added to the output data and the value of the master counter 31 indicating the identical timing for respective pieces of the output data.

The transfer circuit 12 sets the calculated first and second difference values as the first and second reference difference values for the respective first and second hardware devices 101, 102. After the transfer circuit 12 sets the first and second reference difference values for the respective first and second hardware devices 101, 102, the transfer circuit 12 determines whether the calculated first and second difference values match the first and second reference difference values for the respective first and second hardware devices 101, 102. In a case where at least one of the first and second hardware devices 101, 102 has no positive matching result, the transfer circuit 12 determines that the multiple pieces of data are not output at the same time point.

Such a data transfer apparatus 1 can determine whether the multiple pieces of output data are output at the same time point. For this reason, the data transfer apparatus 1 prevents the occurrence of a situation where multiple pieces of output data are determined to have been output at the same time point even though they were not output at the same time point. Thus, it is possible to improve the reliability of data acquisition.

The communication unit 11 acquires the output data after the data transfer apparatus 1 is powered on. As a result, it is possible that the data transfer apparatus 1 suppress the occurrence of wasteful processing in which output data is acquired even though the first and second hardware devices 101, 102 have not been powered on and the first and second hardware devices 101, 102 have not output data.

The data transfer apparatus 1 further includes a retransmission request unit 34. The retransmission request unit 34 requests a hardware device being at least one of the first and second hardware devices 101, 102 in which the difference value does not match the reference difference value, in a case where the data transfer apparatus 1 determines that the multiple pieces of output data are not output at the same time point. Therefore, the data transfer apparatus 1 can increase the frequency of acquiring data at the same time point from the first and second hardware devices 101, 102.

The retransmission request unit 34 selects the hardware device with a higher priority (hereinafter referred to as priority hardware device or priority device) from the first and second hardware devices 101, 102, and request another hardware device different from the priority hardware device to output data to be consistent with the time at which the priority hardware device outputs data. Therefore, the data transfer apparatus 1 can reduce the processing load of acquiring data at the same time point from the first and second hardware devices 101, 102.

The data transfer apparatus 1 generates no-data notification indicative of no data, in a case where the hardware device being requested to output data cannot output the corresponding data. As a result, the data transfer apparatus 1 can notify the transfer destination (that is, the CPU 111, the SRAM 112 and the SDRAM 113) that the data cannot be acquired at the same time point.

In the present disclosure, the data transfer apparatus 1 corresponds to a timing determination apparatus; a communication unit 11 corresponds to a data acquisition unit; S20 and S30 correspond to processes executed by a reference setting unit; and S120 corresponds to a process executed by a notification generation unit.

In the present disclosure, a certain predetermined period corresponds to a predetermined period; the first and second cycle counters 121, 122 correspond to a cycle counter; the first and second hardware devices 101, 102 correspond to a hardware device; the first and second difference values correspond to a difference value; the first and second reference difference values correspond to a reference difference value; and the determination condition of S70 corresponds to a matching determination condition.

Although one embodiment of the present disclosure has been described above, the present disclosure is not limited to the above embodiment, and various modifications can be made.

First Modification

The above embodiment describes that the data transfer apparatus 1 is connected to two hardware devices. However, the data transfer apparatus 1 may be connected to three hardware devices.

Second Modification

In the above embodiment, in a case where the difference between the difference value and the reference difference value is zero, it is determined that the difference value matches the reference difference value. However, in a case where the difference between the difference value and the reference difference value is smaller than or equal to a preset matching determination value such as 10, it may be determined that the difference value matches the reference difference value.

The transfer circuit 12 and the techniques thereof according to the present disclosure may be implemented by one or more special-purposed computers. Such a special-purposed computer may be provided by configuring a processor and a memory programmed to execute one or more functions embodied by a computer program.

Alternatively, the transfer circuit 12 and the method thereof described in the present disclosure may be implemented by a dedicated computer provided by configuring a processor with one or more dedicated hardware logic circuits. Alternatively, the transfer circuit 12 and the method thereof described in the present disclosure may be implemented by one or more dedicated computers configured by a combination of a processor and a memory programmed to perform one or a plurality of functions and a processor configured with one or more hardware logic circuits. Further, the computer program may be stored in a computer-readable non-transitory tangible storage medium as instructions to be executed by a computer. The technique for realizing the functions of each unit included in the transfer circuit 12 does not necessarily need to include software, and all the functions may be realized using one or more hardware circuits.

Multiple functions belonging to one configuration element in the above-described embodiment may be implemented by multiple configuration elements, or one function belonging to one configuration element may be implemented by multiple configuration elements. Multiple functions belonging to multiple configuration elements may be implemented by one configuration element, or one function implemented by multiple configuration elements may be implemented by one configuration element. A part of the configuration of the above embodiment may be omitted. At least a part of the configuration of the above embodiment may be added to or replaced with another configuration of the above embodiment.

Aside from the above-mentioned data transfer apparatus 1, the present embodiment can also be implemented in various modes including a system including the data transfer apparatus 1 as a component, a program for causing a computer to function as the data transfer apparatus 1, a non-transitional tangible recording medium, such as a semiconductor memory, recording the program, a timing determination method, and the like.

What is claimed is:

1. A timing determination apparatus comprising:
  a data acquisition unit configured to acquire output data sets being data sets transmitted from respective hardware devices, each of the hardware devices having a cycle counter configured to be incremented each time a predetermined period has elapsed, each of the hardware devices configured to transmit a data set including an output cycle counter value being a value of the cycle counter at a time of transmitting the data set;
  a master counter configured to be incremented each time the predetermined period has elapsed;
  a subtractor configured to calculate a difference value for each of the output data sets in a case where the data acquisition unit acquires the output data sets at a same timing, the difference value being a difference between the output cycle counter value and an identical master counter value, the identical master counter value being a value of the master counter and indicating the same timing, the output cycle counter value being included in each of the output data sets;
  a reference setting unit configured to set the difference value calculated by the subtractor as a reference difference value for each of the hardware devices; and
  a comparing determination unit configured to
    determine whether the hardware devices satisfy a preset matching determination condition after the reference setting unit sets the reference difference value for each of the hardware devices, the preset matching determination condition being a condition in which a difference value calculated by the subtractor matches the reference difference value, and
    determine that the hardware devices have not transmitted the data sets at a same time point in a case where the comparing determination unit determines that at least one of the hardware devices does not satisfy the preset matching determination condition.

2. The timing determination apparatus according to claim 1,
  wherein the data acquisition unit is further configured to acquire the output data sets after the timing determination apparatus is powered on.

3. The timing determination apparatus according to claim 1, further comprising:
  a retransmission request unit configured to request the at least one of the hardware devices to retransmit the data set in a case where the comparing determination unit determines that the hardware devices have not transmitted the data sets at the same time point, the at least one of the hardware devices being a requested device in which the difference value does not match the reference difference value.

4. The timing determination apparatus according to claim 3, wherein
  the hardware devices include a priority device and an other device, and
  the retransmission request unit is further configured to:
    set the priority device to have higher priority than the other device; and
    request the other device to retransmit a data set at a time point where the priority device transmits a data set.

5. The timing determination apparatus according to claim 3, further comprising:
  a notification generation unit configured to generate absence notification indicative of absence of a data set transmitted from the requested device in a case where the requested device is incapable of transmitting the data set.

6. A timing determination apparatus comprising:
  a transfer circuit connected to respective hardware devices through a bus, the transfer circuit including at least one of (i) a circuit and (ii) a processor with a memory storing computer program code executable by the processor, the at least one of the circuit and the processor configured to cause the transfer circuit to:

acquire output data sets being data sets transmitted from the respective hardware devices through the bus, each of the hardware devices having a cycle counter configured to be incremented each time a predetermined period has elapsed, each of the hardware devices configured to transmit a data set including an output cycle counter value being a value of the cycle counter at a time of transmitting the data set;

increment each time the predetermined period has elapsed;

calculate a difference value for each of the output data sets in a case of acquiring the output data sets at a same timing, the difference value being a difference between the output cycle counter value and an identical master counter value, the identical master counter value being a value of the master counter and indicating the same timing, the output cycle counter value being included in each of the output data sets, set the difference value calculated by the transfer circuit as a reference difference value for each of the hardware devices, determine whether the hardware devices satisfy a preset matching determination condition after the transfer circuit sets the reference difference value for each of the hardware devices, the preset matching determination condition being a condition in which a difference value calculated by the transfer circuit matches the reference difference value, and determine that the hardware devices do not transmit the data sets at a same time point in a case where the transfer circuit determines that at least one of the hardware devices does not satisfy the preset matching determination condition.

7. A timing determination apparatus comprising:

a data acquisition circuit configured to acquire output data sets being data sets transmitted from respective hardware devices, each of the hardware devices having a cycle counter configured to be incremented each time a predetermined period has elapsed, each of the hardware devices configured to transmit a data set including an output cycle counter value being a value of the cycle counter at a time of transmitting the data set;

a master counter configured to be incremented each time the predetermined period has elapsed;

a subtractor configured to calculate a difference value for each of the output data sets in a case where the data acquisition circuit acquires the output data sets at a same timing, the difference value being a difference between the output cycle counter value and an identical master counter value, the identical master counter value being a value of the master counter and indicating the same timing, the output cycle counter value being included in each of the output data sets;

a reference setting circuit configured to set the difference value calculated by the subtractor as a reference difference value for each of the hardware devices; and a comparing determination circuit configured to determine whether the hardware devices satisfy a preset matching determination condition after the reference setting circuit sets the reference difference value for each of the hardware devices, the preset matching determination condition being a condition in which a difference value calculated by the subtractor matches the reference difference value, and determine that the hardware devices have not transmitted the data sets at a same time point in a case where the comparing determination circuit determines that at least one of the hardware devices does not satisfy the preset matching determination condition.

8. The timing determination apparatus according to claim 7, wherein the data acquisition circuit is further configured to acquire the output data sets after the timing determination apparatus is powered on.

9. The timing determination apparatus according to claim 7, further comprising:

a retransmission request circuit configured to request the at least one of the hardware devices to retransmit the data set in a case where the comparing determination circuit determines that the hardware devices have not transmitted the data sets at the same time point, the at least one of the hardware devices being a requested device in which the difference value does not match the reference difference value.

10. The timing determination apparatus according to claim 9, wherein the hardware devices include a priority device and an other device, and the retransmission request circuit is further configured to:
set the priority device to have higher priority than the other device; and
request the other device to retransmit a data set at a time point where the priority device transmits a data set.

11. The timing determination apparatus according to claim 9, further comprising:

a notification generation circuit configured to generate absence notification indicative of absence of a data set transmitted from the requested device in a case where the requested device is incapable of transmitting the data set.

* * * * *